(12) United States Patent
Okada et al.

(10) Patent No.: US 6,975,056 B2
(45) Date of Patent: Dec. 13, 2005

(54) STATOR

(75) Inventors: Tomoyuki Okada, Shioya-gun (JP); Mitsuyoshi Takao, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/902,929

(22) Filed: Aug. 2, 2004

(65) Prior Publication Data

US 2005/0029891 A1 Feb. 10, 2005

(30) Foreign Application Priority Data

Aug. 6, 2003 (JP) .............................. 2003-288078

(51) Int. Cl.⁷ .............................. H02K 3/46; H02K 1/18

(52) U.S. Cl. ...................................... 310/194; 310/254

(58) Field of Search ................................ 310/194, 214, 310/254, 43, 215

(56) References Cited

U.S. PATENT DOCUMENTS

| | | | | |
|---|---|---|---|---|
| 6,127,753 A | * | 10/2000 | Yamazaki et al. | ............ 310/71 |
| 2004/0245882 A1 | * | 12/2004 | Horie et al. | ................ 310/194 |
| 2004/0263015 A1 | * | 12/2004 | Okada et al. | ................ 310/194 |

FOREIGN PATENT DOCUMENTS

| | | | | |
|---|---|---|---|---|
| JP | 08223843 A | * | 8/1996 | ............ H02K 3/52 |
| JP | 10285841 A | * | 10/1998 | ............ H02K 1/18 |
| JP | 2000-245092 | | 9/2000 | |
| JP | 2000341896 A | * | 12/2000 | ............ H02K 3/46 |
| JP | 2003018781 A | * | 1/2003 | ............ H02K 3/46 |
| WO | 3021746 A1 | * | 3/2003 | ............ H02K 3/52 |
| WO | 3065544 A1 | * | 8/2003 | ............ H02K 3/34 |

* cited by examiner

Primary Examiner—Burton Mullins
(74) Attorney, Agent, or Firm—Westerman, Hattori, Daniels & Adrian, LLP

(57) ABSTRACT

A stator which includes an insulating bobbin which is fitted upon a tooth. The insulating bobbin includes a tooth insulating portion which insulates between the tooth and a rectangular wire, and a first extending portion and a second extending portion which extend from the end portions of the tooth insulating portion roughly parallel with an inner surface of a yoke; a guide groove, which guides the rectangular wire from the outside of the first extending portion slantingly with respect to the circumferential direction of the tooth insulating portion, is provided upon one side of the first extending portion in a one axial direction of the stator; and a first protruding portion, which supports the rectangular wire slantingly with respect to the circumferential direction of the tooth insulating portion, is provided at a corner portion which connects between the first extending portion and the tooth insulating portion.

6 Claims, 7 Drawing Sheets

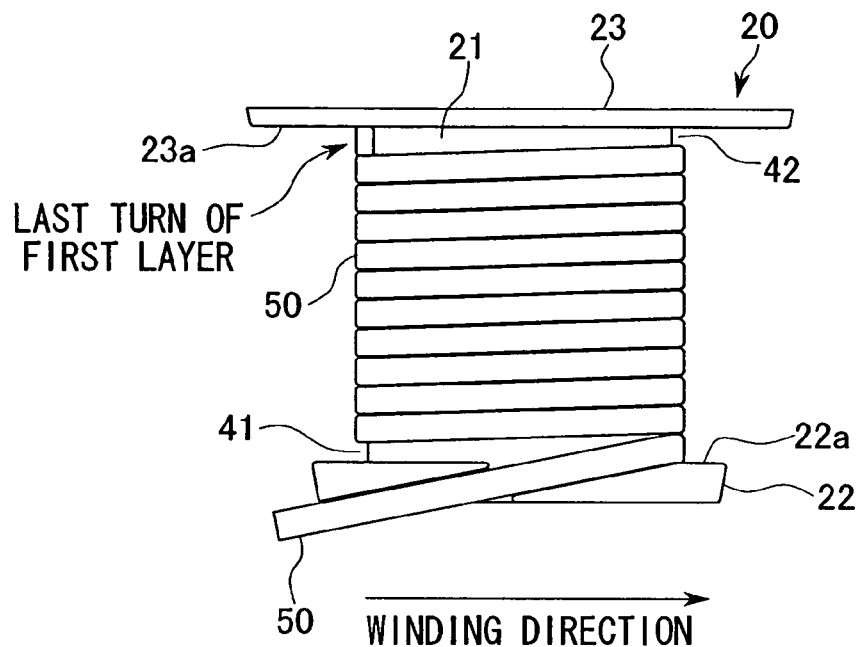
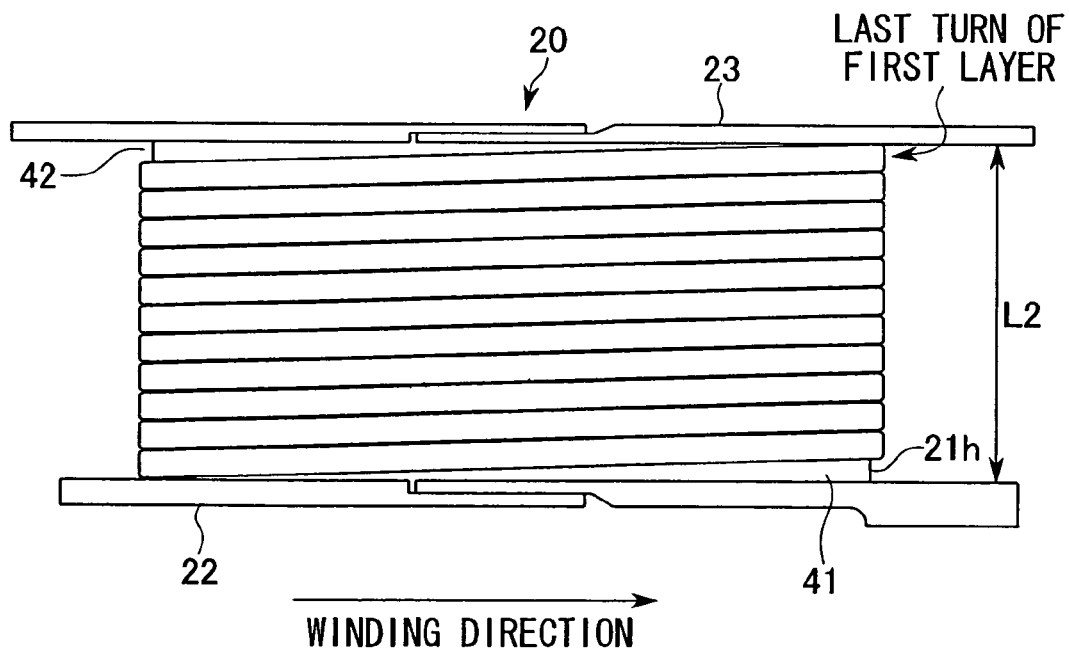

STATOR

BACKGROUND OF THE INVENTION

1. Field of the Invention

The present invention relates to a stator which is used in a rotating electrical machine such as an electric motor or an electric generator.

This application is based on Japanese Patent Application No. 2003-288078, filed Aug. 6, 2003, the contents of which are incorporated herein by reference.

2. Background Art

As the winding of a stator in a rotational electrical machine, there are known, per se, a winding which is made using a so called round wire whose cross section is approximately circular, and a winding which is made using a so called rectangular wire whose cross section is approximately rectangular.

Since gaps occur between the turns of a round wire even if they are wound very tightly and closely, the resulting space factor is inevitably rather low; but, by contrast, with a rectangular wire, there is the advantage that, by appropriately lining up the coils side by side, it is possible to attain a high space factor without the occurrence of any substantial gaps. Here by "space factor" is meant the ratio of the coil wire occupation area to the slot cross sectional area; as is per se well known, it is possible to anticipate enhancement of the performance of a rotational electrical machine by increasing the space factor.

In this connection, since the space factor is reduced if a winding fault occurs when winding such a rectangular wire upon an insulating bobbin, which is undesirable, accordingly it is necessary to wind the rectangular wire upon the bobbin without the occurrence of faults.

As a prior art technique for preventing the occurrence of such winding faults, there are known, for example, the technique described in Patent Document 1 (Japanese Patent Laying Open Publication 2000-245092), and the like. With this technique disclosed in Patent Document 1, by lining up the insulating bobbin or the like while shaping the form of the rectangular wire with a special type of shaping device, it is ensured that no winding faults are engendered while performing the winding.

However, in the case of this prior art technique, there is the problem that the manufacturing cost is increased, because it is necessary to perform special form shaping for the rectangular wire as a pre-processing stage before actually winding up the rectangular wire upon the bobbin, and this requires a great deal of man-hours.

Furthermore, there is the problem that the construction of the winding machine for doing this job becomes rather complicated, so that the cost of the equipment is increased, since a shaping device is required for performing this special form shaping upon the rectangular wire.

Thus the objective of the present invention is, by merely adding a simple constructional feature to the insulating bobbin, to provide a stator with which it is possible to prevent the occurrence of winding faults when winding the rectangular wire.

BRIEF SUMMARY OF THE INVENTION

According to the present invention, there is proposed a stator (for example, in a preferred embodiment which will be described hereinafter, a stator 1), comprising a circular ring shaped yoke (for example, in the preferred embodiment which will be described hereinafter, a yoke 1a), teeth (for example, in the preferred embodiment which will be described hereinafter, teeth or T-portions 12) which are provided at predetermined intervals around the circumference of the yoke, an insulating bobbin which is fitted upon each of the teeth (for example, in the preferred embodiment which will be described hereinafter, an insulating bobbin 20), and a rectangular wire (for example, in the preferred embodiment which will be described hereinafter, a rectangular wire 50) which is wound up upon the insulating bobbin, wherein: the insulating bobbin comprises a tooth insulating portion (for example, in the preferred embodiment which will be described hereinafter, a tooth insulating portion 21) which insulates between the tooth and the rectangular wire, and a first extending portion (for example, in the preferred embodiment which will be described hereinafter, a first extending portion 22) and a second extending portion (for example, in the preferred embodiment which will be described hereinafter, a second extending portion 23) which extend from the end portions of the tooth insulating portion roughly parallel with an inner surface of the yoke; a guide groove (for example, in the preferred embodiment which will be described hereinafter, a guide groove 24), which guides the rectangular wire from the outside of the first extending portion slantingly with respect to the circumferential direction of the tooth insulating portion, is provided upon one side of the first extending portion in a one axial direction of the stator; and a first protruding portion (for example, in the preferred embodiment which will be described hereinafter, a first protruding portion 31), which supports the rectangular wire slantingly with respect to the circumferential direction of the tooth insulating portion, is provided at a corner portion (for example, in the preferred embodiment which will be described hereinafter, a corner portion 25) which connects between the first extending portion and the tooth insulating portion.

According to this construction, it is possible to insert the rectangular wire slantingly from the outside of the first extending portion of the insulating bobbin by inserting the rectangular wire along the guide groove of the first extending portion, so that it is possible to insert the rectangular wire into the tooth insulating portion without kinking it or bending it unduly; and, furthermore, it is possible to wind up the first turn of the first layer of the rectangular wire upon the tooth insulating portion smoothly.

Yet further, along with it being possible to wind up the first turn of the first layer of the rectangular wire along the first protruding portion, also it is possible to wind up the final turn of the second layer of the rectangular wire by carrying it up over the first protruding portion.

According to the present invention, the excellent results are attained that, by inserting the rectangular wire along the guide groove, it is possible to insert the rectangular wire into the tooth insulating portion without kinking it or bending it unduly, and moreover that it is possible to wind up the starting winding of the first turn of the first layer of the rectangular wire smoothly upon the tooth insulating portion. Even further, since it is possible to wind up the first turn of the first layer of the rectangular wire along the first protruding portion, accordingly it is possible to wind up the first turn of the rectangular wire in an extremely stable manner. Furthermore, it is possible to prevent the occurrence of winding faults in the final turn of the second layer of the rectangular wire, since it is possible to wind up this final turn of the second layer of the rectangular wire by carrying it up over the first protruding portion.

Finally, since it is possible to prevent the occurrence of winding faults when thus winding a rectangular wire upon such an insulating bobbin of the described structure, accordingly it is possible to perform the task of winding by utilizing a very conventional type of winding machine; in other words, it is not necessary to perform special craftsmanship or to utilize any special type of winding machine, in order to obtain the beneficial results which accrue due to the application of the present invention. As a result, as compared to the prior art, it is possible to anticipate a reduction in the cost of the equipment required, and a reduction in the cost of the workforce required, which will naturally lead to a reduction in the cost of the resulting product, i.e. of the stator according to the present invention.

Moreover, according to a particular specialization of the present invention, the first protruding portion may support a final portion of a first turn of a first layer of the rectangular wire.

By employing this structure, it is possible to wind up the final portion of the first turn of the first layer of the rectangular wire along the first protruding portion. Since it is thus possible to wind up the final portion of the first turn of the first layer of the rectangular wire along the first protruding portion, accordingly, along with it being possible to wind up this final portion of the first turn of the first layer of the rectangular wire in an extremely stable manner, also it is possible to perform the rather ticklish task of changing over from the first turn of the rectangular wire to its second turn in an extremely smooth and stable manner.

Furthermore, according to another particular specialization of the present invention, the first protruding portion may support a portion of the rectangular wire which includes a final corner portion of a first turn of a first layer thereof. By employing this structure, it is possible to wind up this portion of the rectangular wire which includes the final corner portion of the first turn of the first layer thereof along the first protruding portion. Since it is thus possible to wind up this portion of the rectangular wire which includes the final corner portion of the first turn of the first layer thereof along the first protruding portion, accordingly, along with it being possible to wind up this portion of the rectangular wire which includes the final corner portion of the first turn of the first layer thereof in an extremely stable manner, also it is possible to perform the rather ticklish task of changing over from the first turn of the rectangular wire to its second turn in an extremely smooth and stable manner.

Yet further, according to yet another particular specialization of the present invention, at a corner portion (for example, in the preferred embodiment which will be described hereinafter, a corner portion 26) which is a connecting portion between the second extending portion and the tooth insulating portion, there may be provided a separate second protruding portion (for example, in the preferred embodiment which will be described hereinafter, a second protruding portion 32 and a third protruding portion 33) which prevents a first turn of a second layer of the rectangular wire from falling into a gap between a final turn of a first layer of the rectangular wire and the second extending portion.

By employing this structure, it is possible to wind up the first turn of the second layer of the rectangular wire by carrying it up over this separate second protruding portion. Since it is possible thus to wind up the first turn of the second layer of the rectangular wire by carrying it up over this separate second protruding portion, accordingly it is possible to prevent the occurrence of winding faults in this first turn of the second layer of the rectangular wire.

Still further, according to still another particular specialization of the present invention, a circular arcuate portion (for example, in the preferred embodiment which will be described hereinafter, a circular arcuate portion 27) which is formed in a circular arc shape may be provided on a corner portion of the second extending portion at a portion which corresponds to a first corner portion of the first turn of the second layer of the rectangular wire.

By employing this structure, when winding up the rectangular wire from the final turn of its first layer to the first turn of its second layer, it is possible to perform this task while engendering as little interference as possible between the extending portion of the rectangular wire (the portion thereof which has not yet been wound up upon the bobbin) and the corner portion of the second extending portion which has thus been formed in a circular arcuate shape. Since it is thus possible to perform the transition from the winding up of the final turn of the first layer of the rectangular wire to the winding up of the first turn of its second layer while engendering as little interference as possible between the extending portion of the rectangular wire (the portion thereof which has not yet been wound up upon the bobbin) and the corner portion of the second extending portion which has thus been formed in a circular arcuate shape, accordingly it is possible to accomplish this transition from the winding up of the final turn of the first layer of the rectangular wire to the winding up of the first turn of its second layer in an extremely smooth manner.

And even further, according to even another particular specialization of the present invention, a beveling process may be performed upon the circular arcuate portion at its tooth insulating portion side.

By employing this structure, it is possible to avoid damage to the rectangular wire, even if perchance some interference may occur between the extending portion of the rectangular wire (the portion thereof which has not yet been wound up upon the bobbin) and the corner portion of the second extending portion which has been formed, as described above, in a circular arcuate shape.

The present invention may be applied to a pillar wound stator such as one which is utilized in a rotational electrical machine such as an electric motor or an electrical generator or the like.

BRIEF DESCRIPTION OF THE SEVERAL VIEWS OF THE DRAWING

FIG. 10 is a front elevation view showing a situation in which a first layer of a rectangular wire has been wound up upon an insulating bobbin of a comparison example, in which no protruding portion is present at the connecting portion between first and second extending portions and a tooth insulating portion.

FIG. 11 is a side view showing the above situation in which this first layer of the rectangular wire has been wound up upon the insulating bobbin of this comparison example.

DETAILED DESCRIPTION OF THE INVENTION

In the following, a preferred embodiment of the stator and of the insulating bobbin according to the present invention will be explained with reference to FIGS. 1 through 12.

Figure 1:
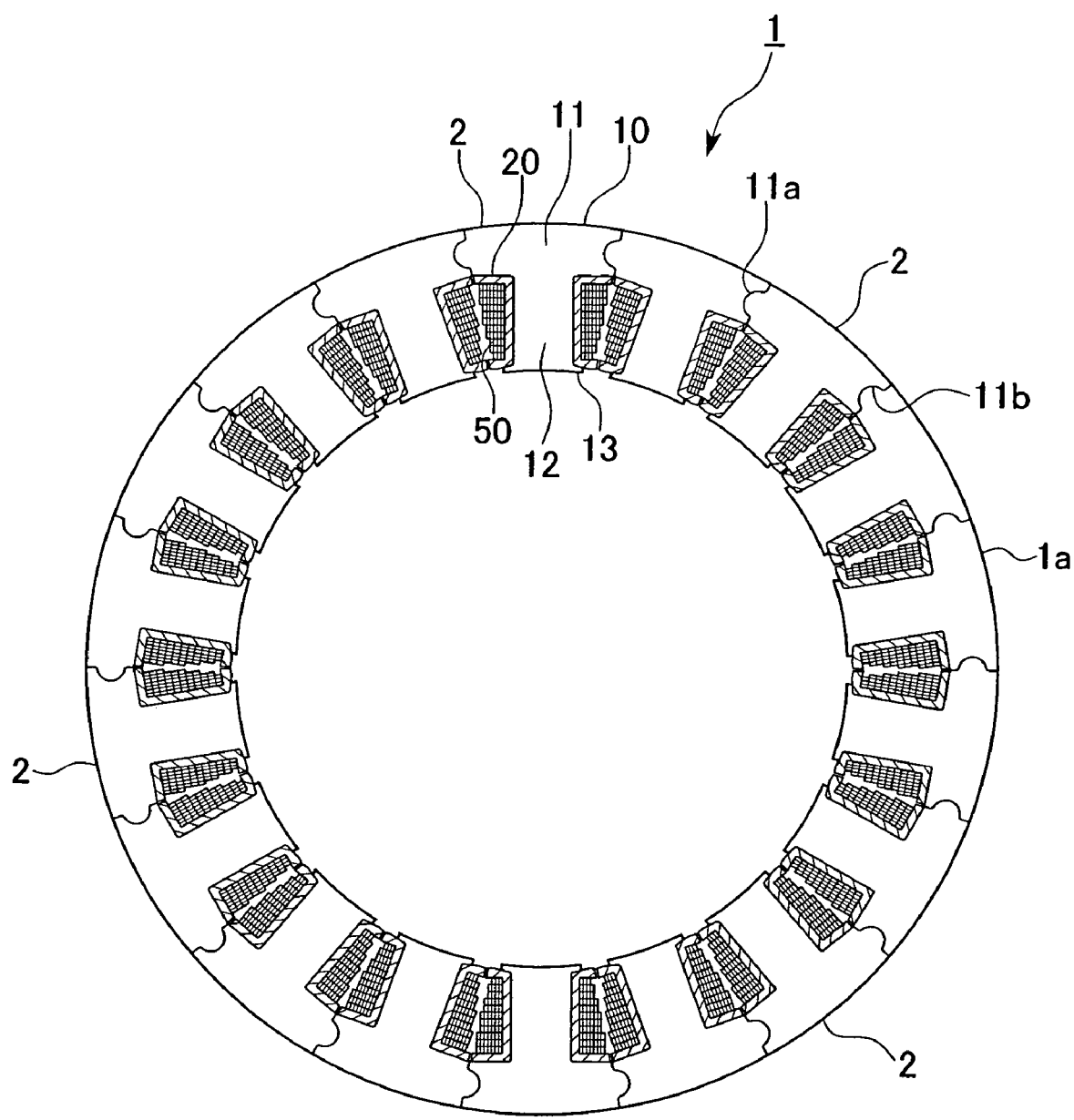
FIG. 1 is an overall sectional view of a preferred embodiment of a stator according to the present invention.

As shown in FIG. 1, a stator 1 is made by connecting a plurality of stator modules 2 which are fitted together in the form of a ring, and this stator may be used in a rotational electrical machine such as an electric motor or an electric generator or the like.

Each of the stator modules 2 comprises a stator core 10 which comprises a yoke portion 11 and a tooth portion (a tooth) 12, an insulating bobbin 20 which is fitted to the tooth portion 12 of the stator core 10, and a rectangular wire 50 which has been wound up upon the insulating bobbin 20.

In this stator 1, by connecting together each of the yoke portions 11 of each of the stator cores 10, a yoke 1a is formed as a connected circular member. In order to make it easy to connect all of these yoke portions 11 together, convex engagement portions 11a are provided upon the one sides in the circumferential direction of each of the yoke portions 11, and, similarly, concave engagement portions 11b are provided upon the other sides of each of the yoke portions 11 in the circumferential direction to these convex engagement portions 11a; and the convex engagement portions 11a and the concave engagement portions 11b are mutually engaged together in pairs all around the stator 1.

The teeth portion 12 has a generally rectangular cross sectional shape, and it extends from the central portion of the yoke portion 11 inwards in the radial direction towards the central axis of the stator 1; and, at the end of this teeth portion 12, there are provided a pair of extending portions 13 which extend in opposite directions along the circumferential direction of the yoke portion 11.

Figure 2:
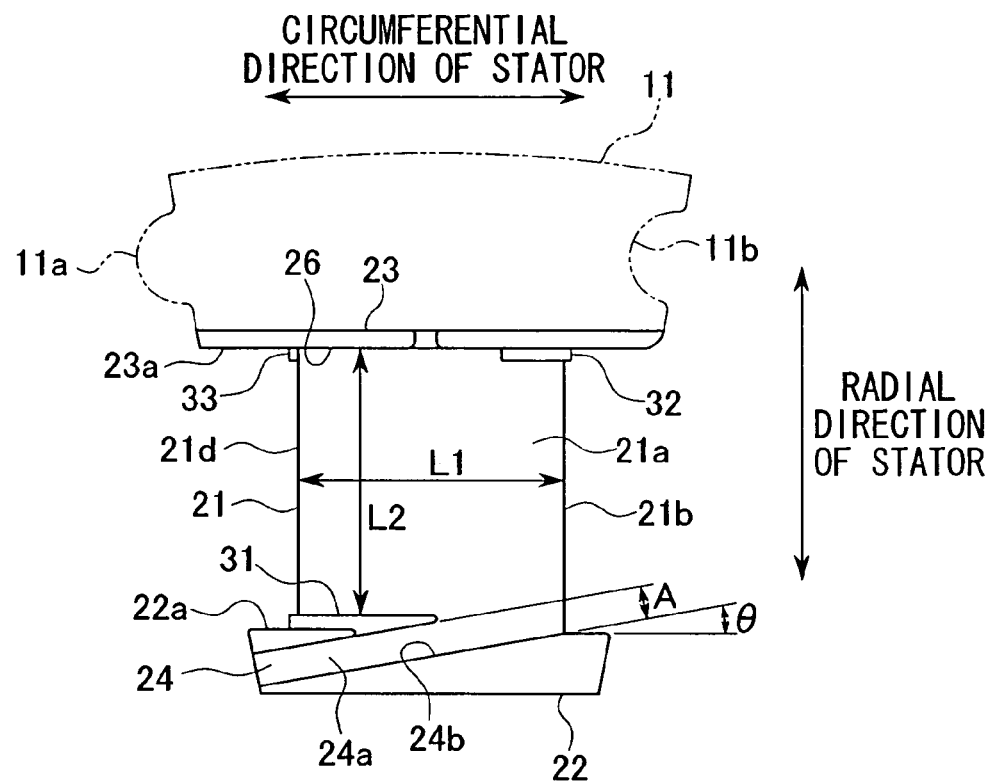
FIG. 2 is a front elevation view of an insulating bobbin which is used in this stator according to the preferred embodiment of the present invention.
Figure 3:
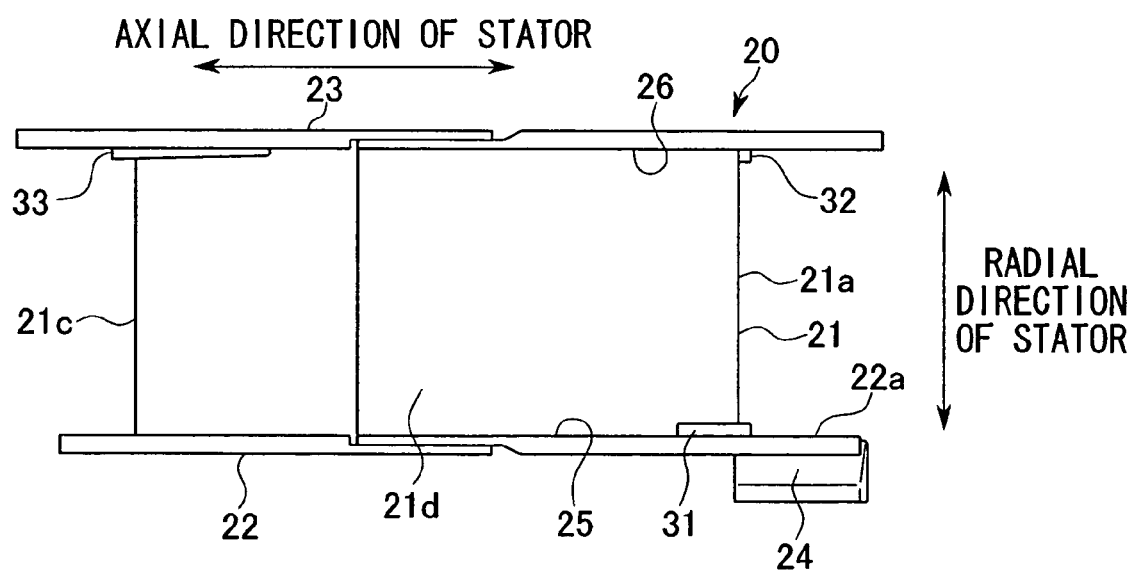
FIG. 3 is a side view of said insulating bobbin.
Figure 4:
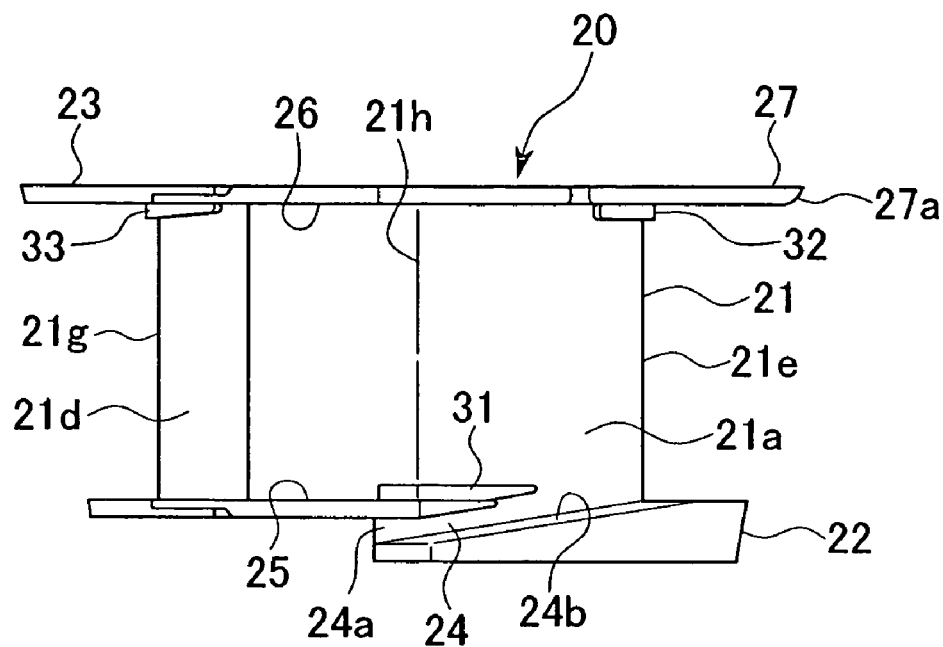
FIG. 4 is a side view of said insulating bobbin as seen from the side of a fourth corner portion thereof.
Figure 6:
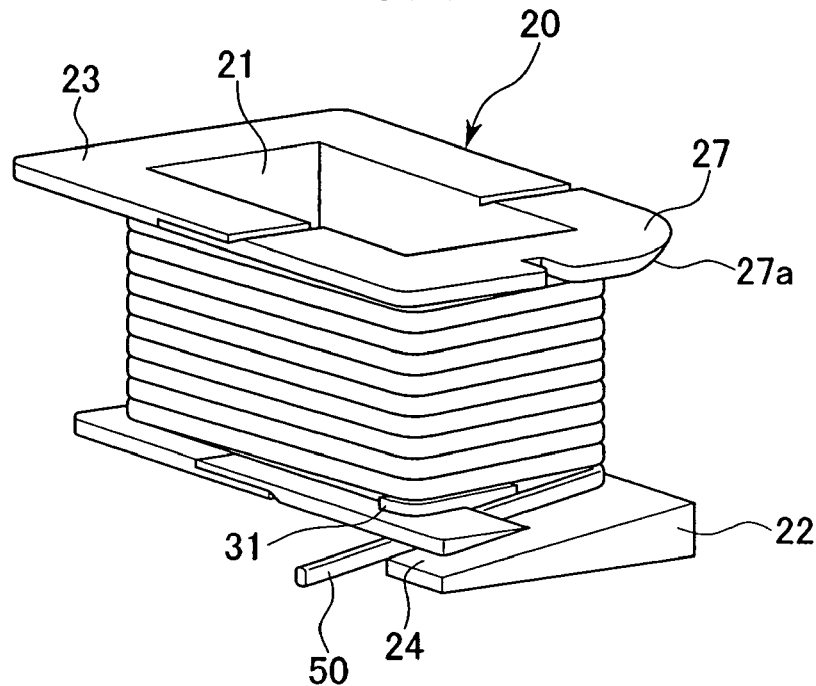
FIG. 6 is a perspective view showing a situation in which only a single layer of a rectangular wire has been wound upon said insulating bobbin.

As shown in FIGS. 2 through 4 and in FIG. 6, the insulating bobbin 20 comprises a tooth insulating portion 21 which has a rectangular tubular shape, and a first extending portion 22 and a second extending portion 23 which extend from the two ends in the axial direction of this tooth insulating portion 21 roughly parallel with respect to the inner surface of the yoke portion 11. This tooth insulating portion 21 is arranged so as to surround the side surfaces of the teeth portion 12, with the first extending portion 22 being arranged to extend along the inner surfaces of the extending portions 13 of the stator core 10, and the second extending portion 23 being arranged to extend along the inner circumferential surface of the yoke portion 11.

Figure 7:
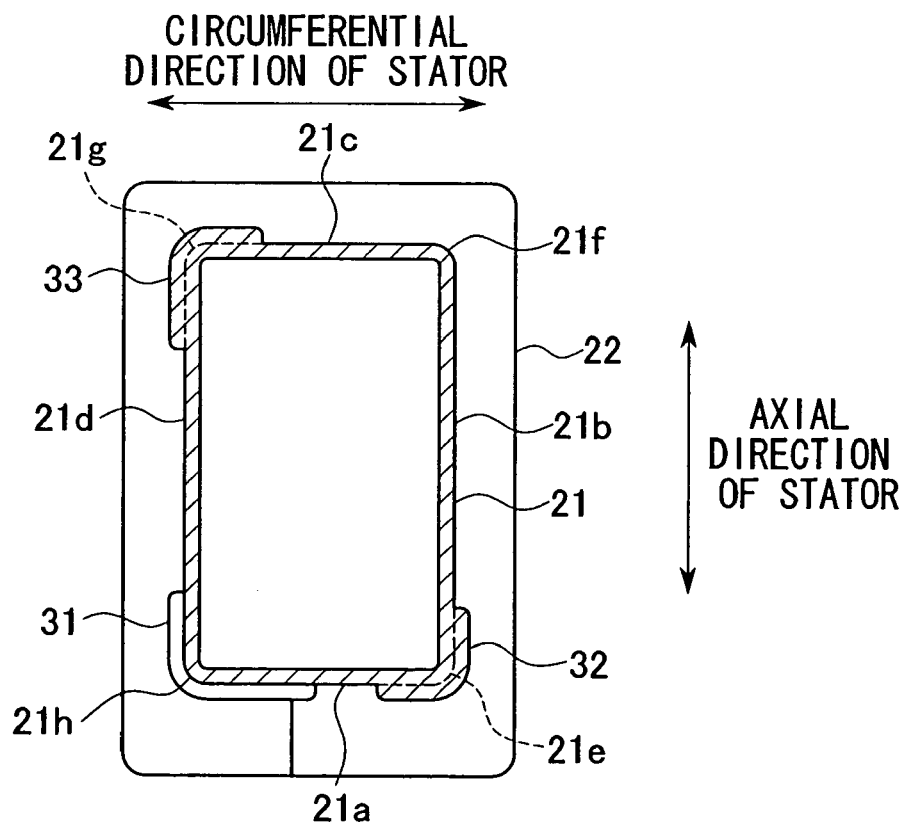
FIG. 7 is a plan view showing said insulating bobbin in a state in which it is broken apart at a connecting portion between a second extending portion and a tooth insulating portion.

FIG. 7 is a cutaway view when the tooth insulating portion 21 has been cut away along its connecting portion with the second extending portion 23 as seen from the side of this cut away cross section, and, in this figure, the tooth insulating portion 21 is shown to have four side surfaces 21a through 21d and four corner portions 21e through 21h. In more detail, these four side surfaces consist of a one side surface 21a on one side in a one axial direction of the stator 1 and an other side surface 21c in the other axial direction of said stator 1, and a one side surface 21b in a one circumferential direction of the stator 1 and an other side surface 21d in the other circumferential direction of said stator 1; while the four corner portions consist of a first corner portion 21e which is defined as the connecting portion between the side surface 21a and the side surface 21b, a second corner portion 21f which is defined as the connecting portion between the side surface 21b and the side surface 21c, a third corner portion 21g which is defined as the connecting portion between the side surface 21c and the side surface 21d, and a fourth corner portion 21h which is defined as the connecting portion between the side surface 21d and the side surface 21a.

At the side of the first extending portion 22 which corresponds to the side surface 21a of the tooth insulating portion 21 (in other words, at its one side in the one axial direction of the stator 1), there is provided a guide groove 24 for inserting a rectangular wire, and a rectangular wire 50 is inserted into the tooth insulating portion 21 via this guide groove 24 from the exterior of the extending portion 22, and is then wound up upon the side surfaces 21a through 21d of the tooth insulating portion 21. It should be understood that, as shown in FIG. 6, after the rectangular wire 50 has been inserted from the guide groove 24, the first turn of the first layer starts to be wound from the side surface 21a of the tooth insulating portion 21, and at the first corner portion 21e the rectangular wire 50 bends around and is wound against the next side surface 21b. In other words, the rectangular wire 50 is first bent around at the first corner portion 21e.

To describe the guide groove 24 in detail with reference to FIG. 3, the bottom surface 24a of the guide groove 24 is formed as a single surface with the side surface 21a of the tooth insulating portion 21, and the widthwise dimension A of this bottom surface 24a is set to be somewhat greater than the widthwise dimension W of the rectangular wire W (i.e., A>W). The lengthwise direction of the guide groove 24 is inclined at an angle with respect to the circumferential direction of the tooth insulating portion 21 (in other words, with respect to the circumferential direction of the stator 1, or, to put it in yet another way, with respect to the surface direction of the inner surface 22a of the extending portion 22), and its angle of inclination is set to be greater than or equal to the angle $\theta$ which is given by the following equation, while being less than or equal to 30°. $\theta = \tan^{-1}$ (widthwise dimension W of the rectangular wire/widthwise dimension L1 of the tooth insulating portion)

The reason why this angle of inclination is set within this type of range is that, if said angle of inclination is less than $\theta$, then, when the second turn of the first layer of the rectangular wire 50 is being wound up upon the tooth insulating portion 21, the portion of the rectangular wire 50 before the beginning of the first winding turn thereof constitutes an obstruction; while, if said angle of inclination is greater than 30°, the bulge at the bent portion of the rectangular wire 50 which is created at the first corner portion 21e becomes large, so that, along with causing an obstacle to the winding of the second and subsequent layers of the rectangular wire 50, this also invites a deterioration of the space factor.

Figure 8:
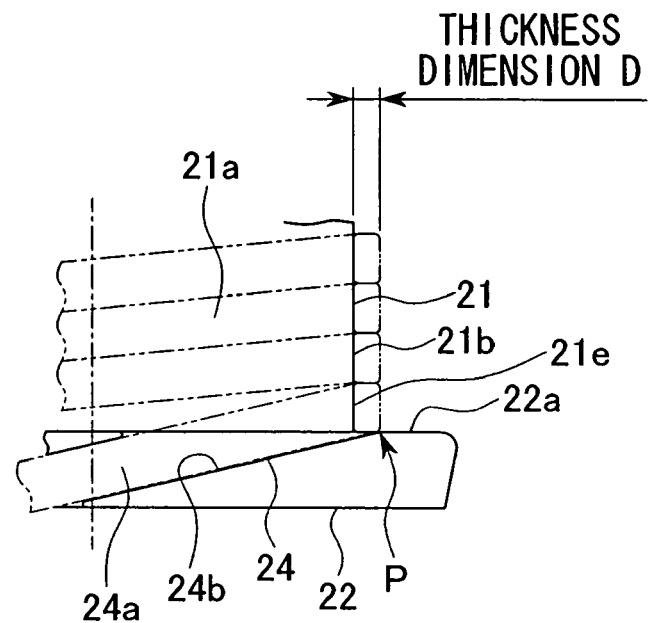
FIG. 8 is a figure for explanation of the position of an intersection point between an outer side surface of a guide groove of said insulating bobbin and an inner surface of a first extending portion.

As shown in FIG. 8, the intersection point P between the inner surface 22a of the extending portion 22 and the outside side surface 24b of the guide groove 24 is set so as to be positioned at the outside from the side surface 21b of the tooth insulating portion 21 by an amount just equal to (or greater than) the thickness dimension D of the rectangular wire 50. By doing this, when winding up the first turn of the first layer of the rectangular wire 50 upon the tooth insulating portion 21, it is possible to perform this winding up at the first corner portion 21e without opening up any gap with the inner surface 22a of the extending portion 22, so that accordingly it is possible to enhance the space factor.

Figure 9:
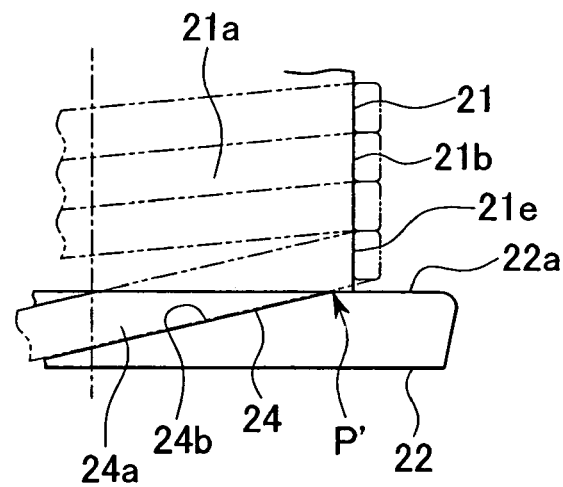
FIG. 9 is an explanatory figure for a comparison example, corresponding to FIG. 8.

FIG. 9 is a figure showing a comparison example, and, in this figure, if the intersection point P' between the inner surface 22a of the extending portion 22 and the outer side surface 24b of the guide groove 24 is positioned more to the side of the center than said intersection point P, then, when starting the winding of the first turn of the rectangular wire 50 along the side surface 21b of the tooth insulating portion 21, a gap undesirably opens up between the rectangular wire 50 at the first corner portion 21 and the inner surface 22a of the extending portion 22, so that the space factor is deteriorated.

By setting the guide groove 24 in this manner, it is possible to make the bottom surface of the rectangular wire 50 coincide with the side surface 21a of the tooth insulating portion 21, and to insert the rectangular wire 50 slantingly from the outside of the first extending portion 22 of the insulating bobbin 20, so that it is possible to wind up the first turn of the first layer of the rectangular wire 50 smoothly upon the side surfaces 21a and 21b of the tooth insulating portion 21 without bending the rectangular wire 50 edgewise.

Furthermore, by being able to wind up the first turn of the rectangular wire 50 smoothly upon the side surfaces 21a and 21b of the tooth insulating portion 21, it becomes unnecessary to twist the rectangular wire 50 or to bend it unduly at its portion where it is inserted into the tooth insulating portion 21, and furthermore no damage is caused to the insulating layer which is formed upon the surface of the rectangular wire 50.

As shown in FIG. 4, at the corner portion 25 of the connecting portion between the tooth insulating portion 21 and the first extending portion 22 of the insulating bobbin 20, a first protruding portion 31 is provided at a predetermined region of the side surface 21a from the side surface 21d, taking the fourth corner portion 21h as the center.

Figure 5:
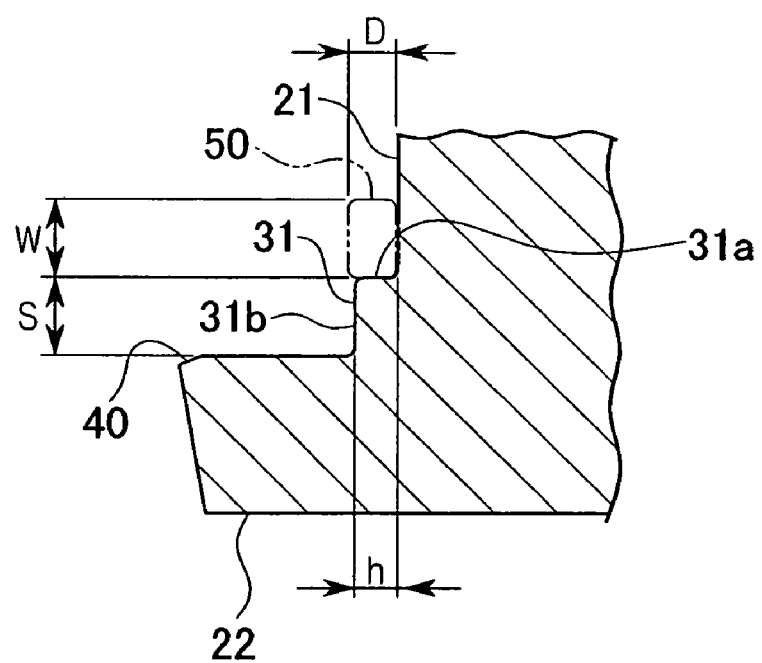
FIG. 5 is an enlarged sectional view showing the vicinity of a first protruding portion of said insulating bobbin.

This first protruding portion 31, as shown in FIG. 5, has a roughly rectangular cross section, and the height dimension h of its side surface 31a on its side which is provided as connecting to the tooth insulating portion 21 is set to be less than or equal to the thickness dimension D of the rectangular wire 50 (i.e., h=D), while the widthwise dimension s of its side surface 31b on the side which is provided as connecting to the first extending portion 22 is set to be less than or equal to the widthwise dimension W of the rectangular wire 50 (i.e., s=W).

Furthermore, at the corner portion 26 which is the connecting portion between the tooth insulating portion 21 and the second extending portion 23, there is provided a second protruding portion 32 at a predetermined region of the side surface 21b from the side surface 21a, taking the first corner portion 21e as the center, and there is provided a third protruding portion 33 at a predetermined region of the side surface 21d from the side surface 21c, taking the third corner portion 21g as the center.

The cross sections of these second and third protruding portions 32 and 33 are shaped roughly as rectangles, just as was that of the first protruding portion 31, and the height dimensions of their side surfaces on their sides which are provided as connecting to the tooth insulating portion 21 are also set to be less than or equal to the thickness dimension D of the rectangular wire 50, just as that of the first protruding portion 31 was.

It should be understood that it is more desirable to make the height dimension h of the side surfaces of the first through the third protruding portions 31, 32, and 33 on the side which is provided as connecting to the tooth insulating portion 21 be almost the same as the thickness dimension D of the rectangular wire 50.

Furthermore, as shown in FIGS. 4 and 6, at the portion on the corner portion of the second extending portion 23 which corresponds to the first corner portion 21e of the tooth insulating portion 21, there is provided a circular arcuate portion 27 which is formed roughly in the shape of a quarter circular arc of large radius, and, at this circular arcuate portion 27, the inner surface side 23a of the second extending portion 23 (in other words, its tooth insulating portion 21 side) is subjected to a beveling process, so as to be made in a chamfered surface 27a.

The reason for providing the first, second, and third protruding portions 31, 32, and 33 is as follows.

First, as a comparison example, the case of winding up a rectangular wire 50 upon an insulating bobbin 20 to which no such protruding portions 31 through 33 are provided will be explained with reference to FIGS. 10 through 12.

As shown in FIG. 10, the rectangular wire 50 which has been inserted via the guide groove 24 into the tooth insulating portion 21 is bend round at the first corner portion 21e and is wound up upon the side surface 21b from the side surface 21a, and, at this time, this rectangular wire 50 is wound up so as to contact the inner surface 22a of the first extending portion 22. And although, in this first turn of the first layer, the rectangular wire 50 is wound up so as to contact the inner surface 22a of the first extending portion 22 at the side surfaces 21b and 21c as well, however, when the rectangular wire 50 is again wound up from the side surface 21d upon the side surface 21a for a second time, since there is a changeover process of changing over from the first turn of the first layer to the second turn of the first layer, as shown in FIGS. 10 and 11, the rectangular wire 50 comes away little by little from the inner surface 22a of the first extending portion 22. Since, at this time, the rectangular wire 50 attempts to perform this changeover via the shortest distance upon the two side surfaces 21d and 21a, which is a characteristic of the rectangular wire 50, accordingly a slippage is engendered at the fourth corner portion 21h, and a gap 41 is generated between the rectangular wire 50 and the inner surface 22a of the first extending portion 22, since the slippage stops at the position where the rectangular wire 50 extends along the shortest distance.

And while, for the second and subsequent turns of the first layer of the rectangular wire 50, the n-th turn of the rectangular wire 50 is being lined up and wound up so as to contact its (n−1)-th turn, it proceeds in the direction to approach towards the second extending portion 23, and finally it approaches most closely to that second extending portion 23 and thereby the winding of the first layer comes to be terminated, and at this time point, as shown in FIG. 10, at this last turn of the first layer, at the fourth corner portion 21h, the side surface of the rectangular wire 50 comes to be in a state of almost being in contact with the inner surface 23a of the second extending portion 23.

Due to this, at the side of the second extending portion 23, another gap 42 is engendered between the final turn of the first layer of the rectangular wire 50 and the inner surface 23a of the second extending portion 23, almost all the way around the bobbin, with the exception of the fourth corner portion 21h.

Figure 12:
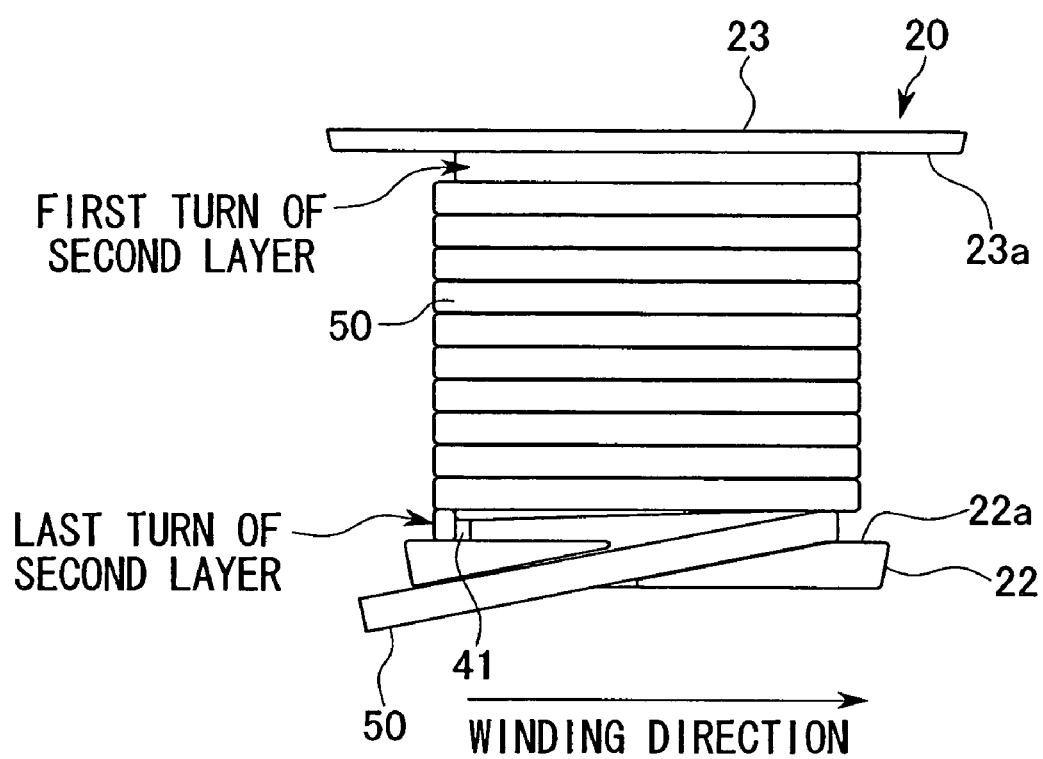
FIG. 12 is a front elevation view showing the situation in which a second layer of the rectangular wire has been wound up upon the insulating bobbin of this comparison example.

After this, the rectangular wire 50 changes over from the final turn of the first layer to the first turn of the second layer, and, as shown in FIG. 12, it is wound up so as to contact the inner surface 23a of the second extending portion 23 at the side of the side surface 21a, and, thereafter, it is wound up in order, each turn against the next, while being layered over the first layer; and this process proceeds in the direction to approach the first extending portion 22, and the winding of this second layer comes to be completed when the rectangular wire 50 approaches at its closest to the first extending portion 22, with the final turn of this second layer being wound up along the inner surface 22a of this first extending portion 22.

Now, there is a dimensional tolerance for the rectangular wire 50, and the length L2 of the tooth insulating portion 21 (i.e. its length along the radial direction of the stator 1) is set so that it will be possible to wind up the predetermined desired number of turns upon it, even if a rectangular wire 50 which is at its upper tolerance limit has been used.

However, if a rectangular wire 50 which is at its lower tolerance limit is used when the length L2 of the tooth insulating portion 21 has been set in this manner, then the gap 42 which is generated between the final turn of the first layer of the rectangular wire 50 and the inner surface 23a of the second extending portion 23 becomes greater than in the case when a rectangular wire 50 which is at its upper tolerance limit has been used, and, in particular, this gap 42 becomes extremely great at the first corner portion 21e.

When proceeding to wind up the rectangular wire 50 upon the insulating bobbin 20 in this manner, if the second and third protruding portions 32 and 33 are not provided, then, since the gap 42 between the final turn of the first layer of the rectangular wire 50 and the inner surface 23a of the second extending portion 23 is formed along almost the entire circumference of the side of the second extending portion 23 with the exception of the fourth corner portion 21h, accordingly, when winding up the first turn of the second layer along the inner surface 23a of the second extending portion 23, it may sometimes happen that a winding fault occurs, such as that a portion of the rectangular wire 50 (typically a corner portion or the like) falls into the gap 42, or the like.

Furthermore, if the first protruding portion 31 is not provided, then, since the gap 41 between the portion of the rectangular wire 50 at the changeover from the first turn of the first layer to the second turn thereof and the inner surface 22a of the first extending portion 22 is formed along almost the entire length of the side surface 21d and the side surface 21a, accordingly, when the final turn of the second layer has been wound up, it may sometimes happen that a winding fault occurs, such as that a portion of the rectangular wire 50 (typically a corner portion or the like) falls into the gap 41, or the like.

By contrast to the above situations, if the second and the third protruding portions 32 and 33 are provided to the insulating bobbin 20, then, when winding up the first turn of the second layer of the rectangular wire 50 along the inner surface 23a of the second extending portion 23, this first turn of the second layer of the rectangular wire 50 is wound up by being carried over the second protruding portion 32 at the first corner portion 21e and somewhat before and after it, and also it is wound up by being carried over the third protruding portion 33 at the third corner portion 21g and somewhat before and after it, so that it is possible to prevent the rectangular wire 50 from falling into the gap 42 between the final turn of the first layer of said rectangular wire 50 and the inner surface 23a of the second extending portion 23, so that, as a result, it is possible to prevent the occurrence of winding faults in the first turn of the second layer of the rectangular wire 50.

Moreover, it is possible to prevent the occurrence of winding faults in the first turn of the second layer of the rectangular wire 50, both in the case that a rectangular wire 50 which is at its upper tolerance limit has been used, and also in the case that a rectangular wire 50 which is at its lower tolerance limit has been used.

Furthermore, if the first protruding portion 31 is provided to the insulating bobbin 20, since the final turn of the second layer of the rectangular wire 50 is wound up by being carried upon the first protruding portion 31 at the fourth corner portion 21h and somewhat before and after it, accordingly it is possible to prevent the rectangular wire 50 from falling into the gap 41 between the first turn of the first layer of the rectangular wire 50 and the inner surface 22a of the first extending portion 22, and, as a result, it is possible to prevent the occurrence of winding faults in the final turn of the second layer of the winding.

Yet further, if the first protruding portion 31 is provided to the insulating bobbin 20, then, when the first turn of the first layer of the rectangular wire 50 is being wound upon the fourth corner portion 21h, the side surface of the rectangular wire 50 is guided by this first protruding portion 31, and the winding up proceeds with this side surface of the rectangular wire 50 being guided in contact with the side surface 31a of the first protruding portion 31, so that, as a result, along with it being possible to wind up the final portion of the first turn of the rectangular wire 50 and its changeover portion from the first turn to the second turn extremely smoothly and stably, also it is possible to eliminate slippage of the rectangular wire 50 at the fourth corner portion 21h.

In order for the first protruding portion 31 to fulfill its function sufficiently, it is desirable for this first protruding portion 31 to be provided so as to be able to support the final portion of the first turn of the first layer of the rectangular wire 50 slantingly with respect to the circumferential direction of the tooth insulating portion 21 (in other words, with respect to the circumferential direction of the stator 1, or, to put it in another manner, with respect to the surface direction of the inner surface 22a of the extending portion 22); and, furthermore, it is more desirable for it to be provided so as to be able to support the portion of the first turn of the first layer of the rectangular wire 50 somewhat before and after and including its said final corner portion in a slanting attitude. In this preferred embodiment of the present invention, the first protruding portion 31 is provided in such a manner as to fulfill these conditions completely.

Furthermore, the reason for providing the circular arcuate portion 27 upon the second extending portion 23 is as follows.

In order to wind up the first layer of the rectangular wire 50 as described above, when winding up the final turn of the first layer of the rectangular wire 50, it is necessary to wind up the rectangular wire 50 in an attitude which is inclined at a certain angle with respect to the circumferential direction of the tooth insulating portion 21 until said rectangular wire 50 has been wound completely around the fourth corner portion 21h of the tooth insulating portion 21, and, in order to do this, at the time point when the final turn of the first layer of the rectangular wire 50 goes around the fourth corner portion 21h, and the winding of the first turn of the second layer of the rectangular wire 50 against the side surface 21a is started, the straight portion of the rectangular wire 50 (the next portion of the rectangular wire 50 which will be wound up from this time point onward) is pulled outwards to the outside more than the second extending portion 23 (outwards of the axial direction of the tooth insulating portion 21).

Due to this, when winding up the first turn of the second layer of the rectangular wire 50 from the side surface 21a of the tooth insulating portion 21 upon the first corner portion 21e, it may happen that said extending portion of the rectangular wire 50 may interfere at the second extending portion 23 with the corner portion which corresponds to the first corner portion 21e. When said corner portion is bent around the corner at this time, there is a danger that the rectangular wire 50 may undesirably catch upon said corner portion, which may hinder the smooth winding up of the rectangular wire 50, and may even cause damage to the rectangular wire 50. In order to cope with this problem, with the stator 1 of this preferred embodiment of the present invention, the circular arcuate portion 27 which is made roughly in the form of the arc of a quarter of a circle of relatively large radius is provided to the corner portion which corresponds to the first corner portion 21e at the second extending portion 23, and this circular arcuate portion 27 prevents interference with the rectangular wire 50, so that catching of the rectangular wire 50 does not occur, and smooth winding up of the rectangular wire 50 is assured.

Furthermore, by providing the chamfered surface 27a to the circular arcuate portion 27 on the side of the inner surface 23a of the second extending portion 23, it is made possible to prevent damage to the rectangular wire 50, even if it should perchance interfere with the circular arcuate portion 27.

It should be understood that, as shown in FIG. 5, beveling 40 may also be performed upon the corner portion of the circumferential edge portion of the first extending portion 22 on the tooth insulating portion 21 side thereof, so that, when the rectangular wire 50 comes into contact with the first extending portion 22 during the winding up of the rectangular wire 50 upon the tooth insulating portion 21, it is ensured that no damage occurs to the insulating layer or the like which is formed upon the surface of the rectangular wire 50. In the same manner, although this is not shown in the drawings, beveling may also be performed upon the corner portion of the circumferential edge portion of the second extending portion 23 on the side of the tooth insulating portion 21.

As has been explained above, according to the stator 1 comprising the insulating bobbin 20 according to this preferred embodiment of the present invention, by providing the guide groove 24 upon the insulating bobbin 20, it is possible to insert the rectangular wire 50 from the outside of the first extending portion 22 while not causing any damage to said rectangular wire 50, and it is possible to start winding said rectangular wire 50 up smoothly upon the tooth insulating portion 21; and, moreover, it is also possible to enhance the space factor.

Furthermore, by providing the first protruding portion 31 to the insulating bobbin 20, along with it being possible to perform the winding up procedure for the portion of the rectangular wire 50 where the change over from the first turn of the first layer to the second turn of said first layer takes place in an extremely stable manner, also it is possible to prevent the occurrence of winding faults of the rectangular wire 50 in the final turn of the second layer.

Yet further, by providing the second and the third protruding portions 32 and 33 to the insulating bobbin 20, it is possible to prevent the occurrence of winding faults in the first turn of the second layer of the rectangular wire 50.

And, as a result of being able to prevent the occurrence of winding faults in the first turn of the second layer of the rectangular wire 50, and of also being able to prevent the occurrence of winding faults in the final turn of the second layer of the rectangular wire 50, it is possible to prevent the occurrence of winding faults in these subsequent layers of the rectangular wire 50 after said second layer as well.

Furthermore, by the circular arcuate portion 27 being provided to the second extending portion 23, and by the chamfered surface 27a being formed upon this circular arcuate portion 27, along with it being possible to perform the winding up of the rectangular wire 50 smoothly from the final turn of the first layer to the first turn of the second layer, also it is possible to prevent the occurrence of damage to the rectangular wire 50.

Furthermore, no special craftsmanship is required for operating the winding machine for manufacturing this stator, since it is possible to prevent winding faults of the rectangular wire 50 by the provision of the first, the second, and the third protruding portions 31, 32, and 33 to the insulating bobbin 20, and moreover it is possible to perform the work of winding by using a completely conventional winding machine.

Another Preferred Embodiment

It should be understood that the present invention is not to be considered as being limited to the preferred embodiment disclosed above.

For example, the first protruding portion 31 which is provided at the corner portion 25, which is the connecting portion between the tooth insulating portion 21 and the first extending portion 22, may not be directly provided at the fourth corner portion 21h, but may quite acceptably be provided in the vicinity of the fourth corner portion 21h, i.e. at the side surface 21d and the side surface 21a of the tooth insulating portion; or, alternatively, it may be provided along almost the entire lengths of the side surface 21d and the side surface 21a of the tooth insulating portion, including the fourth corner portion 21h.

Furthermore, with regard to the other protruding portions (the second protruding portion 32 and the third protruding portion 33) which are provided at the corner portion 26, which is the connecting portion between the tooth insulating portion 21 and the second extending portion 23, they may also be provided at the second corner portion 21f as well; or, alternatively, they may be provided at portions other than the corner portion; or, indeed, they may be provided along almost the entire circumference of the corner portion 26.

Accordingly, while a preferred embodiment of the invention has been described and illustrated above, it should be understood that this preferred embodiment is exemplary of the invention and is not to be considered as limiting. Additions, omissions, substitutions, and other modifications can be made without departing from the spirit or scope of the present invention. Therefore, the present invention is not to be considered as being limited by the foregoing description, but is only to be limited by the scope of the appended claims.

What is claimed is:

1. A stator, comprising a circular ring shaped yoke, teeth which are provided at predetermined intervals around the circumference of said yoke, a insulating bobbin which is fitted upon each of said teeth, and a rectangular wire which is wound up upon said insulating bobbin, wherein:

said insulating bobbin comprises a tooth insulating portion which insulates between said tooth and said rectangular wire, and a first extending portion and a second extending portion which extend from the end portions of said tooth insulating portion roughly parallel with an inner surface of said yoke;

a guide groove, which guides said rectangular wire from the outside of said first extending portion slantingly with respect to the circumferential direction of said tooth insulating portion, is provided upon one side of said first extending portion in an axial direction of said stator; and a first protruding portion, which supports said rectangular wire slantingly with respect to the circumferential direction of said tooth insulating portion, is provided at a corner portion which connects between said first extending portion and said tooth insulating portion.

2. A stator as described in claim 1, wherein said first protruding portion supports a final portion of a first turn of a first layer of said rectangular wire.

3. A stator as described in claim 1, wherein said first protruding portion supports a portion of said rectangular wire which includes a final corner portion of a first turn of a first layer thereof.

4. A stator as described in claim 1, wherein, at a corner portion which is a connecting portion between said second extending portion and said tooth insulating portion, there is provided a separate second protruding portion which prevents a first turn of a second layer of said rectangular wire from falling into a gap between a final turn of a first layer of said rectangular wire and said second extending portion.

5. A stator as described in claim 4, wherein a circular arcuate portion which is formed in a circular arc shape is provided on a corner portion of said second extending portion at a portion which corresponds to a first corner portion of said first turn of said second layer of said rectangular wire.

6. A stator as described in claim 5, wherein a beveling process is performed upon said circular arcuate portion at its tooth insulating portion side.

* * * * *